Aug. 30, 1955     E. G. FORSSELL     2,716,496
SHOCK ABSORBING MECHANISMS FOR RAILWAY DRAFT RIGGINGS
Filed March 25, 1953     3 Sheets-Sheet 1

Inventor:
Eric G. Forssell.
By Henry Fuchs
Atty.

Aug. 30, 1955 E. G. FORSSELL 2,716,496
SHOCK ABSORBING MECHANISMS FOR RAILWAY DRAFT RIGGINGS
Filed March 25, 1953 3 Sheets-Sheet 2

Inventor:
Eric G. Forssell.
By Henry Fuchs
Atty.

Aug. 30, 1955 E. G. FORSSELL 2,716,496
SHOCK ABSORBING MECHANISMS FOR RAILWAY DRAFT RIGGINGS
Filed March 25, 1953 3 Sheets-Sheet 3
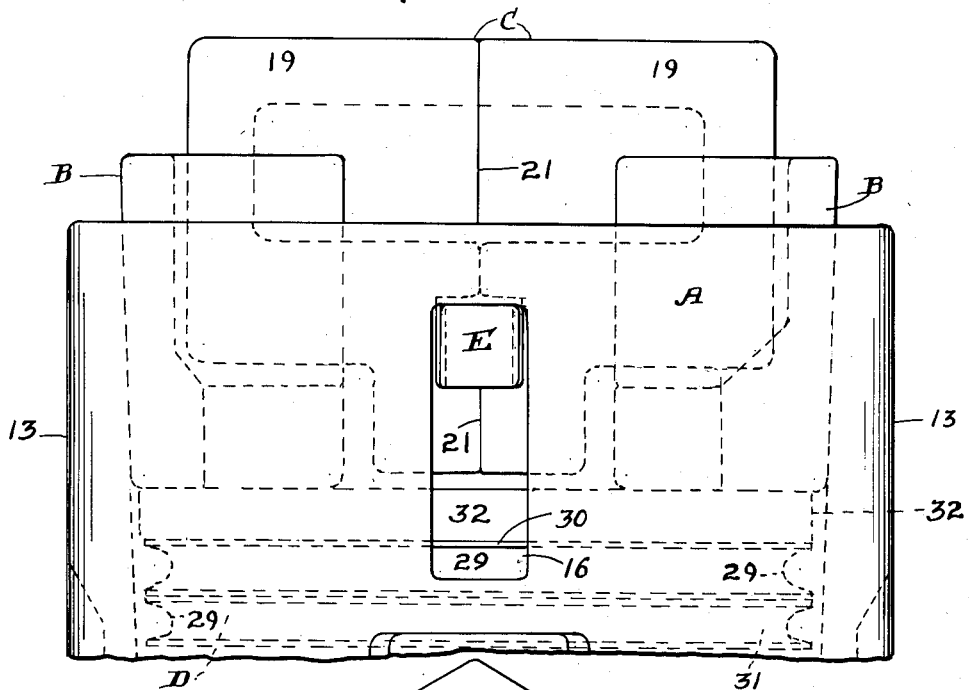
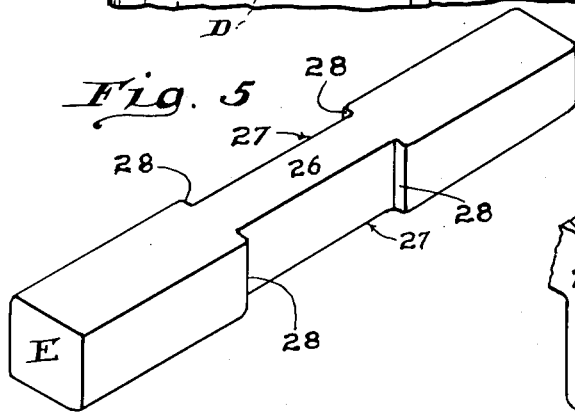
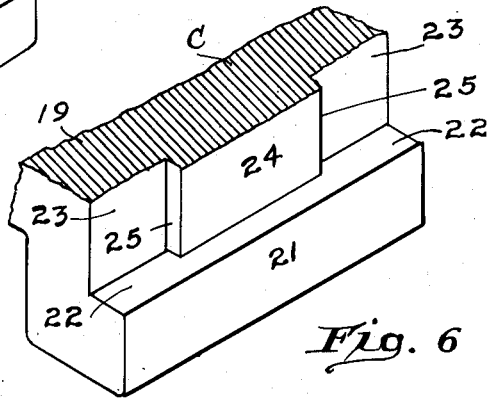
Inventor:
Eric G. Forssell.
By Henry Fuchs
Atty.

United States Patent Office 2,716,496
Patented Aug. 30, 1955

2,716,496

SHOCK ABSORBING MECHANISMS FOR RAILWAY DRAFT RIGGINGS

Eric G. Forssell, Kenmore, N. Y., assignor to W. H. Miner, Inc., Chicago, Ill., a corporation of Delaware Application March 25, 1953, Serial No. 344,535

4 Claims. (Cl. 213—34)

This invention relates to improvements in shock absorbing mechanisms for railway draft riggings, and more particularly to means for holding the parts of a mechanism of this character assembled.

One object of the invention is to provide a shock absorbing mechanism comprising a casing open at one end, friction shoes slidable within the open end of the casing, yielding means within the casing opposing inward movement of the shoes, a wedge in wedging engagement with the shoes, and a retaining element extending through the wedge and connected to the casing for limiting outward movement of the wedge and thus holding the parts of the mechanism assembled, wherein the retaining element and the wedge have shouldered engagement with each other to lock the retaining element against removal with respect to the wedge and casing.

A more specific object of the invention is to provide a mechanism as set forth in the preceding paragraph, wherein the wedge is composed of two sections which are pressed together by the wedging action between the shoes and wedge, and wherein the wedge sections and the retaining element have cooperating shoulders which are held in operative engagement with each other when the sections of the wedge are pressed together, thereby holding the retaining element against endwise removal with respect to the wedge.

Other objects of the invention will more clearly appear from the description and claims hereinafter following.

In the accompanying drawings forming a part of this specification, Figure 1 is a part plan and part horizontal sectional view of my improved shock absorbing mechanism, the section corresponding substantially to the line 1—1 of Figure 2.

Figure 4 is a top plan view of Figure 2, partly broken away.

Figure 5 is a perspective view of the retaining key of my improved mechanism.

Figure 6 is a broken, perspective, and part sectional view of the inner end portion one of the sections of the wedge, illustrating the locking shoulders for the retaining element.

Figure 1:
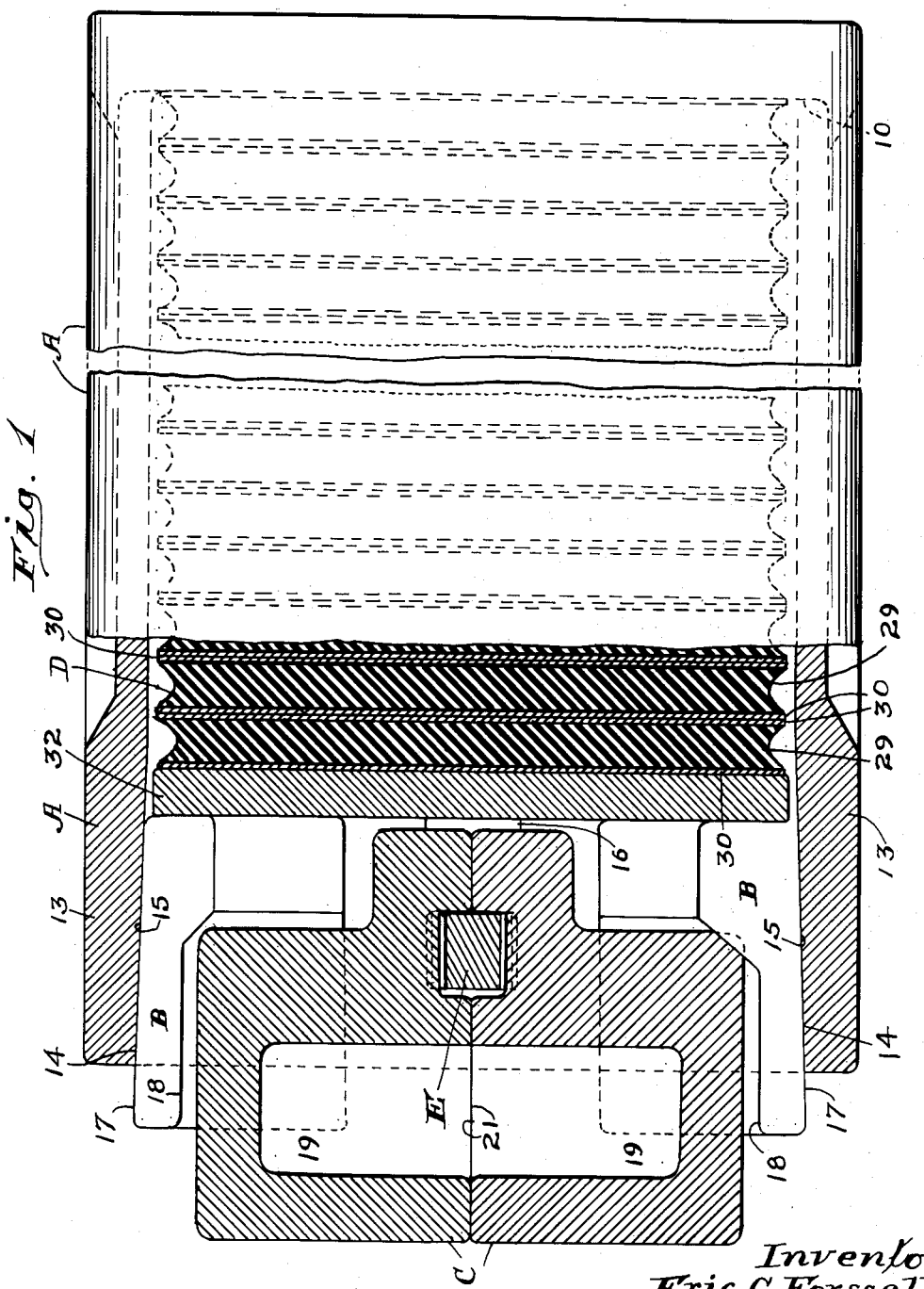
Figure 2:
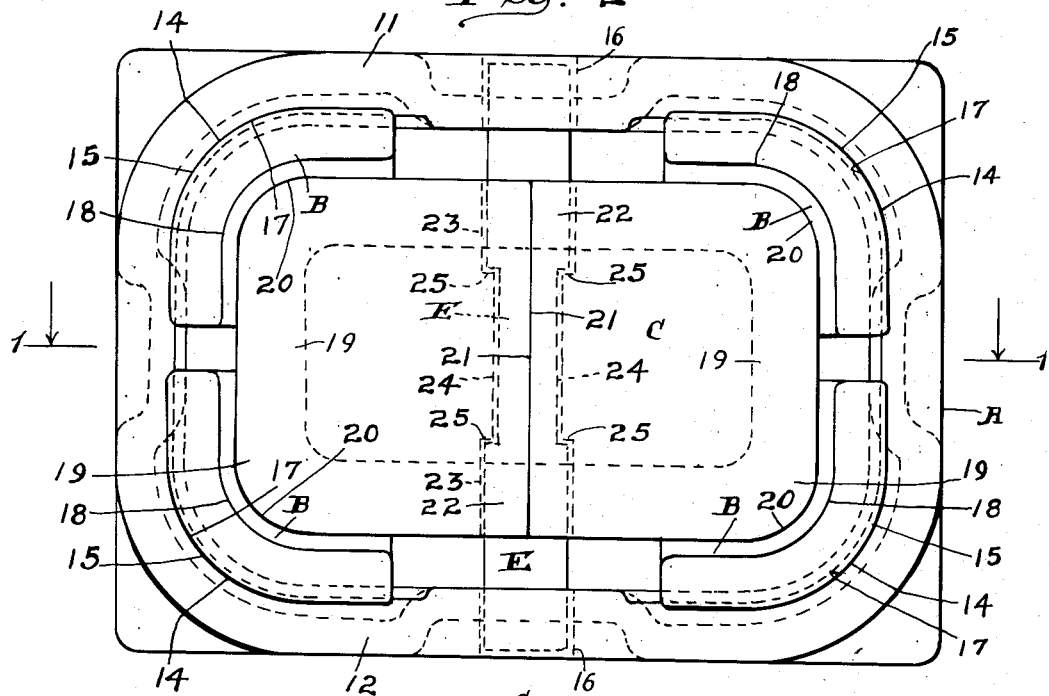
Figure 2 is a front end elevational view of Figure 1.

As illustrated in the drawings, my improved shock absorbing mechanism comprises broadly a casing A, a set of four friction shoes B—B—B—B, a two-part sectional wedge C, a cushioning means D within the casing, and a retaining key E for the wedge.

The casing A is in the form of a rectangular box-like shell, open at its front end and closed by a transverse vertical wall 10 at its rear end. The casing A has lengthwise extending, horizontally disposed, vertically spaced, top and bottom walls 11 and 12, and lengthwise extending, laterally spaced, vertical side walls 13—13. At the forward or open end, the top, bottom, and side walls 11—12 and 13—13 of the casing are connected by curved walls 14—14—14—14, thus providing rounded portions at the four corners of the casing. These rounded corner portions, together with the adjacent straight wall portions of the casing provide four internal friction surfaces 15—15—15—15, located at the four corners of the casing. These friction surfaces converge inwardly of the casing, thus providing a tapered friction shell section. The top and bottom walls 11 and 12 of the casing are provided with vertically aligned, lengthwise extending slots 16—16 for the retaining key E.

The four friction shoes B—B—B—B are arranged within the casing A in sliding engagement with the friction surfaces 15—15—15—15 thereof, one shoe being disposed in each corner thereof and having a friction surface 17 on the outer side thereof which corresponds in cross section to the cooperating surface 15 of the casing. On the inner side, each shoe has a lengthwise extending wedge face 18 of substantially V-shaped, transverse cross section, which is inclined inwardly toward the longitudinal center axis of the mechanism.

The wedge C is split lengthwise, thus providing two sections 19—19, which are located at the opposite sides of the central longitudinal axis of the casing A. Each section 19 of the wedge C presents two wedge faces 20—20 of V-shaped, transverse cross section at the outer side thereof, which are located, respectively, at the top and bottom corners of the same and engage with the V-shaped wedge faces 18—18 of the shoes B—B at the corresponding side of the casing, the wedge faces 20—20 being correspondingly inclined to the wedge faces 18—18. One the inner sides thereof, the two sections of the wedge present substantially flat, lengthwise extending, vertically disposed, opposed faces 21—21, which are vertically slotted to provide key seats 22—22. The key seat 22 of each section 19 of the wedge C has the inner wall thereof, which wall is indicated by 23, provided with a central protrusion 24 presenting stop shoulders 25—25 at the top and bottom ends.

The key E is in the form of a rectangular bar. This bar is of reduced thickness between its ends, as indicated at 26, to provide recesses 27—27 at opposite sides thereof, presenting transverse stop shoulders 28—28. The key E extends through the wedge C, between the sections 19—19 thereof, and has its opposite ends extending into, and slidingly guided in the slots 16—16 of the casing. The central portion of the key E is embraced by the sections 19—19 of the wedge C, the same being engaged with the seats 22—22 of these sections, with the protrusions 24—24 engaged in the recesses 27—27 of the key E, thus holding the key against endwise displacement with respect to the wedge, the cooperating shoulders 25—25 and 28—28 being engaged with each other.

The cushioning means D comprises a plurality of rubber units 29—29, each composed of a pair of metal plates 30—30 and an interposed rubber pad 31, which is vulcanized to the plates. The units 29 of the cushioning means are arranged in series within the casing A in back of the shoes B—B—B—B, a rectangular follower plate 32 being interposed between the front unit of the series and the shoes, and the rearmost unit of the series bearing on the rear wall 10 of the casing A. The cushioning means D is under initial compression in the assembled condition of the mechanism and forcibly wedges the shoes B—B—B—B against the sectional wedge C to hold the latter contracted in interlocked condition with the key E, with the latter held against the front ends of the slots 16—16 of the casing A. As will be evident, the slots 16—16 are of such a length as to allow rearward movement of the key to an extent to permit compression of the mechanism to the desired amount, which is preferably produced when the wedge has been forced inwardly flush with the front end of the casing, and the usual front follower, not shown, of the draft rigging is brought into engagement with the front end of the casing.

Figure 3:
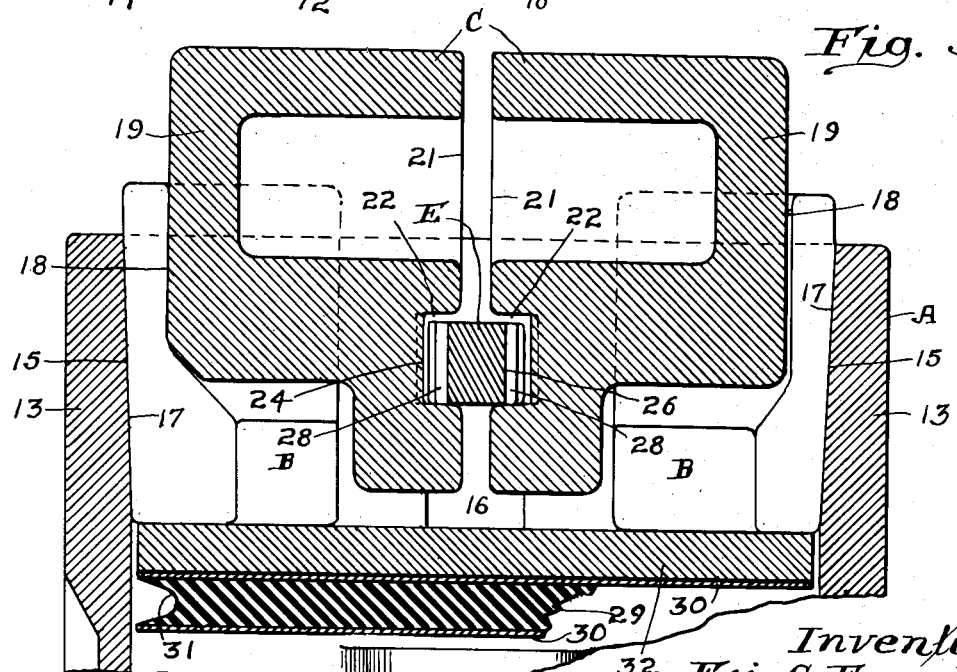
Figure 3 is a sectional view of the front end portion of the mechanism, corresponding to Figure 1, illustrating the manner of assembling the mechanism.

In assembling the mechanism, the cushioning means D, follower plate 32, shoes B—B—B—B, and the sectional wedge C are placed within the casing while the latter is stood on end in upright position, the follower plate being interposed between the lower ends of the shoes and the cushioning means D, and the wedge C resting loosely on the shoes. The shoes B—B—B—B are forced downwardly against the resistance of the cushioning means D until the parts reach the positions shown in Figure 3. When thus positioned, the sections 19—19 of the wedge C are relieved from the wedging pressure of the shoes and may be readily spread apart a sufficient distance to permit the thicker end portions of the key E to pass into and through the key seats 22—22 of the sections 19—19. While the parts are held in this position, the key E is entered between the sections 19—19 of the wedge C by inserting the key endwise through one of the slots 16 of the casing. After the key has been brought to the proper position, the pressure is removed from the shoes B—B—B—B, permitting the cushioning means D to project the shoes against the wedge C to contract the sections 19—19 thereof and clamp the key within the seats 22—22 of said sections, with the shoulders 28—28 of the key abutting the shoulders 25—25 of the key seats 22—22.

I claim:

1. In a friction shock absorbing mechanism, the combination with a casing having opposed walls, said walls containing elongated key receiving slots extending lengthwise of the casing; of friction shoes slidingly telescoped within the casing; a two-part split wedge in wedging engagement with said shoes; yielding cushioning means within the casing pressing against said shoes to wedge the two parts of the wedge together; and a key connecting the wedge to the casing, said key extending through said slots and being embraced between said parts of the wedge, and said parts of the wedge and key having cooperating shoulders holding the key against endwise displacement.

2. In a friction shock absorbing mechanism, the combination with a casing having opposed walls, said walls containing elongated key receiving slots extending lengthwise of the casing; of friction shoes slidingly telescoped within the casing; a two-part split wedge in wedging engagement with said shoes; yielding cushioning means within the casing pressing against said shoes to wedge the parts of the wedge together; and a key connecting the wedge to the casing, said key extending through said slots and having a reduced central portion, said key being embraced between said parts of the wedge, said parts of the wedge having projecting portions interengaged with said reduced portion of the key for holding the key against endwise displacement.

3. In a friction shock absorbing mechanism, the combination with a casing having opposed walls, said walls being provided with aligned, elongated key receiving slots extending lengthwise of the casing; of friction shoes slidingly telescoped within the casing; a two-part split wedge in wedging engagement with the shoes, said parts abutting on their inner sides; yielding cushioning means within the casing pressing against said shoes to wedge the parts of the wedge together; and a key connecting the wedge to said casing, said key having its opposite ends slidingly guided in said elongated key receiving slots and being embraced between said parts of the wedge, said parts of the wedge having aligned key seats on their abutting sides to accommodate said key, said key and parts of the wedge having interengaging projections and recesses for locking said key against removal in endwise direction.

4. In a friction shock absorbing mechanism, the combination with a casing having opposed walls, said walls being provided with aligned key receiving slots; of friction shoes slidingly telescoped within the casing; a two-part split wedge in wedging engagement with the shoes, said parts abutting on their inner sides, said parts having aligned key seats on their abutting sides; yielding cushioning means within the casing pressing against said shoes to wedge the parts of said wedge together; and a key connecting said wedge to the casing, said key being embraced between said parts of the wedge, with the embraced portion thereof closely fitting the seats to lock the wedge to said key, the opposite ends of said key being slidingly guided in the slots of the casing, the portion of said key which is embraced between said parts of the wedge having locking recesses therein and said parts of the wedge having locking projections in the seats thereof, engaged in the locking recesses of said key to hold the latter against endwise displacement.

References Cited in the file of this patent

UNITED STATES PATENTS

| | | |
|---|---|---|
| 1,941,787 | Clark | Jan. 2, 1934 |
| 2,466,932 | Dath (B) | Apr. 12, 1949 |
| 2,492,525 | Dath (A) | Dec. 27, 1949 |
| 2,644,684 | Spence et al. | July 7, 1953 |